3,621,612
PROCESS OF REGULATING PLANT GROWTH
Frederic E. Porter, Minneapolis, Minn., assignor to
Northrup, King & Co., Minneapolis, Minn.
Filed Apr. 24, 1970, Ser. No. 31,499
Int. Cl. A01c *1/06*
U.S. Cl. 47—58                                9 Claims

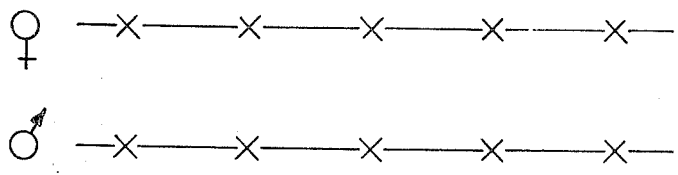
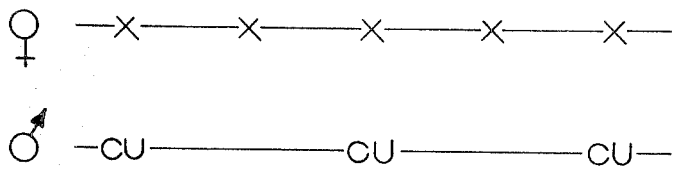
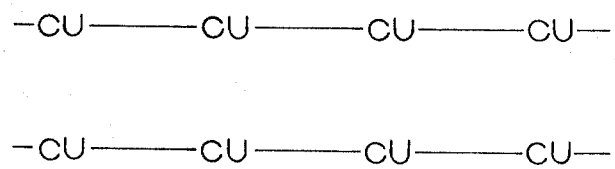
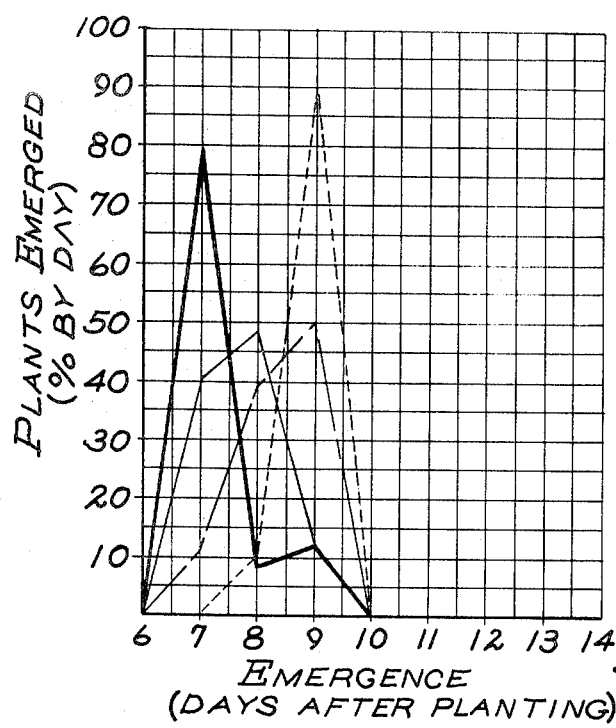
FIG. 5
♀ ≡ FEMALE SEED
♂ ≡ MALE SEED
C ≡ COATED SEED
U ≡ UNCOATED SEED
X ≡ SEED
INVENTOR.
FREDERIC E. PORTER

United States Patent Office 3,621,612
Patented Nov. 23, 1971

ABSTRACT OF THE DISCLOSURE

Seeds (e.g. seed corn) are coated to retard or delay emergence of the seedlings following planting. Then, coated seeds are planted in competitive proximity to uncoated seeds to permit competition between the resulting seedlings, thereby preserving through the flowering and maturation phases of growth the time lag or delay caused by the coatings.

BACKGROUND OF THE INVENTION

The dates on which agricultural plants flower and the dates on which they mature are important dates to both the seed grower and to the ultimate user. For example, in producing hybrid seed corn, it is necessary for the seed grower to cross-pollinate female corn of one type with male corn of a different type. Since different types of corn have life cycles which are differently timed, it is usually necessary to delay the planting of the more quickly flowering type for a time sufficient to permit the two types to flower at the same time. Otherwise, pollen is made available at a time when the female plant is not receptive. However, as a result of the delay in planting one of the two types of seed to be hybridized, the seeds of the two types are not exposed to the same environmental conditions (e.g. sunlight, rain, etc.) and precise matching of flowering dates may not result. Moreover, planting difficulties are sometimes encountered (e.g. too much rainfall at the time when the second planting should begin).

The problem of the seed user is somewhat different. In this instance, the problem is not one of trying to have two types of seeds to flower at the same time, but rather is one of avoiding simultaneous maturity by plants of a single type planted at the same time. For example, one having a home garden might wish to plant corn for personal use. However, when superior modern hybrid sweet corn is used, the plants will all reach final maturity at the same time. This does not coincide with normal eating habits. Consequently, it is common practice for seed growers to sell seed corn which is a mixture of grossly different kinds of corn which mature at different times. In this way it is possible for some corn to be mature at any given point in time, thereby providing the gardener with a relatively constant source of supply at a reduced rate which more nearly matches his desired rate of consumption. A disadvantage of this procedure is that the user or consumer is provided with a number of different types of corn of varied appearance and texture when a single type would be preferred.

Accordingly, there exists a need for a process of regulating the life cycles of plants in a way which will avoid the problems associated with prior art techniques.

SUMMARY OF THE INVENTION

The present invention involves the application of a combination of two techniques. The first technique is delaying plant emergence by coating some of the seed (e.g. coating the male type). The second technique is preserving this delay in emergence by means of competition between plants obtained from uncoated seeds and those obtained from coated seeds, both seeds being planted at the same time.

THE DRAWINGS

FIG. 1 is a schematic diagram showing adjacent rows of planted male and female seeds.

FIG. 2 is a schematic diagram showing a row of female seeds adjacent to a row of paired male seeds, the pairs consisting of coated and uncoated seeds in common hills.

FIG. 3 is a schematic diagram showing two rows of coated and uncoated seeds planted in pairs.

FIG. 4 is a graph showing the effect of coatings on the emergence of seedlings.

FIG. 5 is a legend identifying the various symbols used in FIGS. 1–3.

DETAILED DESCRIPTION

The seeds

The present invention is applicable to all plant seeds. However, the innate or inherent differences between seeds must be taken into consideration when using them in the practice of this invention. Crop seeds, particularly grain and vegetable seeds, are especially well suited for use in this invention. Thus, agricultural seeds such as corn, wheat, barley, sorghum, cucumber, garden bean, cabbage, lettuce, radish, and the like can be used in the practice of this invention. The use of corn is particularly preferred. For the purposes of convenience, and without intending to be limited thereby, the following description of this invention is made with particular reference to corn seeds.

Coating the seeds

Any material can be used to coat seeds for use in this invention provided only that the coating does not substantially damage the seed. The essential requirement of any coating is that the type of coating and amount used should be such as to delay the emergence of a seedling from the coated seed for a desired number of days after planting. Powdered (e.g. clay), waxy (e.g. paraffin) and resinous (e.g. dicyclopentadiene polymers) coatings can be used. Examples of suitable coatings include bentonite clay, wax, moisture curing polyurethane resins, epoxy/polyester resin systems, bisphenol epichlorohydrin resins, cyclopentadiene copolymers and the like. If desired, coatings of two or more different materials can be applied to the same seeds. For example, seeds which are rough or uneven can be pre-coated with clay and thereafter top-coated with a water-resistant or water proofing substance (e.g. a synthetic polymer or resin).

Multiple coatings or multiple layers of coatings are preferred since the integrity of the overall coating is improved. For example, it sometimes happens that a single coating of polyurethane resin will not completely cover the surface of a seed whereas additional coatings tend to protect "holidays" that appear in the first coating. "Holidays" can result from the failure of a coating to wet the surface of the seed because of the wax-like layer that is sometimes present on the surface of the seeds.

The temperature and techniques of application that are used in obtaining these coatings can vary widely. Thus, tumbling techniques, fluidized bed techniques, and the like can be used. The technique of application and the conditions of application of the coating (e.g. the temperature) should be selected so as to prevent substantial damage to the seed involved.

As illustrative of the prior art on seed coating, see the following publication and U.S. patents:

Plastic Coated Seeds, Crops and Soils Magazine, August-September 1967, p. 8 et seq.
U.S. 2,502,809, Vogelsang, Apr. 4, 1950
U.S. 2,579,733, Burgesser, Dec. 25, 1951

As illustrative of the types of coatings and techniques which can be used to coat granular materials, see the following patents:

U.S. 3,223,518, Hansen, Dec. 14, 1965
U.S. 3,264,088, Hansen, Aug. 2, 1966
U.S. 3,264,089, Hansen, Aug. 2, 1966
U.S. 3,285,223, Sahlin, Nov. 15, 1966

The amount of coating that is applied to the seed and the number of coatings thereof can vary widely, depending upon the choice of coating material, the seed to which it is applied, and the delay in emergence that is required. In general, a plurality of coatings is preferred (i.e. two or more coatings) and the total coating weight (on a dry basis) will be from 0.1 to 10 weight percent, more usually from 0.5 to 1 weight percent, based on the weight of the uncoated seed.

The planting process

The planting process of the present invention involves two techniques or stages. The first technique is the use of coatings on seeds to delay or retard the time at which seedlings will emerge from such seeds. The second technique is the use of competition between plants grown from coated and uncoated seeds to thereby preserve the time delay caused by the coating. The combined application of these two techniques can be understood by reference to the following description when read in conjunction with the drawings.

In the production of hybrid seed corn, rows of male and female seeds (from which the hybrid is to be derived) are planted adjacent one another. See FIG. 1. Various planting patterns are employed. By way of example, four rows of female seeds can be planted, followed by two rows of male seeds, followed by four more rows of female seeds, followed by two more rows of male seed, etc. Since a single male plant can pollinate a substantial number of female plants, it is only necessary for a small percentage (e.g. 10%) of the male plants to shed pollen at a time when the female plants are fertile (i.e. in silk) to obtain successful hybridization.

As previously indicated, the growth cycles of different types of seeds will vary, and it is often necessary to delay the planting of either the male or the female seed for a number of days (e.g. less than 30 days) so that the time at which the male seed flowers and shed pollen and the time at which the female ova are mature coincide. Frequently (although not always), the male plant will flower sooner than the female plant and thus the male seed is planted after the female seed.

Prior attempts have been made to delay the flowering of the more rapidly flowering seed by coating that seed with a water resistant or water repellent coating. Although such a technique delays the time at which seedlings grown from the coated seeds emerge from the surface of the soil, the time between planting and tasseling or flowering tends to remain constant. Likewise, the time between flowering or tasseling and final maturity also tends to remain constant. Therefore, the delays in emergence which are caused by coating the seeds are not maintained up to and including the flowering phase of the growth cycle of corn. For this reason, coating the more rapidly maturing seed has not been considered a solution to the problem of matching flowering of the male seed with fertility of the female seed.

This matching effect can be achieved by the practice of this invention. According to this invention, a portion of the faster maturing or flowering seed is coated as previously described. These coated seeds are then planted close to uncoated seeds, usually in pairs. The distance between the paired seeds can vary depending upon soil conditions, type of seed, and weather conditions. Generally, good results are obtained with corn when the seeds which constitute a pair are closer than 10 cm. to each other (e.g. closer than 5 cm.). See FIG. 2. By planting coated and uncoated seeds of the same seed type in competitive proximity to each other, the seedling developed from the uncoated seed will emerge before the seedling from the coated seed. The earlier emerging seedling will then utilize available moisture and nutrients at the expense of the later emerging seedling derived from the coated seed. The competition stress remains, even under varied conditions, and has a stabilizing effect. This competition results in slower growth for the later emerging seedling (i.e. the one suffering from competition) and the time delay in emergence caused by the coating is then extended through the flowering phase of the growth cycle. Therefore, the plant derived from the coated seed will flower at the proper time to fertilize female plants located in adjacent rows. By contrast, the plant derived from the uncoated seed will flower at about its normal time which will not coincide with the time of fertility of the female seed in the adjacent rows. Therefore, the pollen shed by this plant will, in most respects, be sacrificed.

The use of this method of planting by the seed user (as contrasted to the seed grower) is shown in FIG. 3. In FIG. 3, the seed user has planted adjacent rows of corn of a single type. In each instance, pairs of coated and uncoated seeds are planted together so as to create competition between the seedlings obtained from the coated and uncoated seeds. The seedlings emerging from the uncoated seeds emerge sooner, grow faster, flower sooner, and mature sooner than the seedlings which emerge from the coated seeds. In this way, mature ears of corn having uniform shape, color, texture and the like are made available (from a combination of coated and uncoated seeds) over a longer period of time than it is possible to obtain by using uncoated seeds of a single type, only.

For the seed user (as contrasted to the seed grower), precise timing of pollen shed is not required. Consequently, the spacing between coated and uncoated corn seeds can be increased to, for example, 15–25 cm. and a useful spread for plant maturity can still be achieved.

In FIG. 4, the effect of multiple thin coatings of a moisture cured, oil extended polyurethane varnish on corn seeds is illustrated. As shown from the heavy line, 80% of the seedlings emerged from uncoated seed after seven days. With a single thin coating (the light or thin line), only 40% of the seedlings emerged after seven days. With two coatings on seeds of the same lot (the broken line), only 10% of the seedlings emerged after seven days. With three coatings (the dotted line), none of the seedlings emerged in seven days. The seeds used to obtain the data shown in FIG. 4 were Northrup, King seeds of the variety RT12K. The seeds were coated in a fluidized bed by spraying this polyurethane resin in dilute solvent solution (6% non-volatile) very thinly and allowing the wet coated seeds to dry before applying subsequent coatings. Approximately one gallon of undiluted commercial liquid varnish was used to produce a total of three coatings on 200 pounds of the corn seed. Thus, the total coating weight for those seeds having the heaviest coating (i.e. three layers or coatings) was approximately 1% by weight based on the weight of the uncoated seed.

In this instance, the coatings were so thin that they caused no appreciable increase in size of the corn seed as determined by visual observation. In this respect, corn seed is sized for planter plates and no shift in plate was required as a result of the coating process.

Further experimentation has shown that alcohols (e.g. ethanol) can be used to speed the curing of polyurethane coatings. For example, in one instance, about 300 grams of corn seed were coated with 10 ml. of a commercial moisture curing polyurethane varnish diluted 8:1 in toluene. Then, the wet surface was wet with 95% ethanol to accelerate the cure of the polyurethane.

What is claimed is:
1. In the process of growing plants from seeds, the improvement which comprises planting coated and uncoated seeds of the same kind in competitive proximity to each other, said coated seeds consisting essentially of seeds having at least one coating thereon which delays the emergence of seedlings from said coated seeds.
2. Process of claim 1 wherein each of said coated seeds is a seed having a plurality of coatings thereon.
3. Process of claim 2 wherein the kind of seed is corn.
4. Process of claim 3 wherein at least one of said coatings is a water-resistant synthetic polymer.
5. Process of claim 3 wherein at least one of said coatings is a polyurethane resin.
6. Process of claim 3 wherein at least one of said coatings is a dicyclopentadiene polymer.
7. Process of claim 3 wherein said coated and uncoated seeds are planted within 5 cm. of each other.
8. Process of claim 3 wherein said process is a hybrid seed process and wherein said coated and uncoated seeds are of the same sex and are planted in rows adjacent to rows of uncoated seeds of the opposite sex.
9. Process of hybridizing corn which comprise the steps of:
(a) coating seed of a first sex with a plurality of coatings of water resistant material which are effective to retard the time for seedlings to emerge from said coated seeds;
(b) planting rows of uncoated seeds of a second sex; and
(c) planting rows of coated and uncoated seeds of said first sex adjacent to said rows of seed of said first sex, said coated and uncoated seeds of said first sex being planted in successive pairs of closely spaced coated and uncoated seeds.

References Cited
UNITED STATES PATENTS

| | | | |
|---|---|---|---|
| 2,651,883 | 9/1953 | Hedrick et al. | 47—57.6 |
| 2,736,139 | 2/1956 | Wise | 47—58 |
| 3,172,752 | 3/1965 | Pierce | 71—62 |
| 3,205,060 | 9/1965 | Lindert | 71—7 |
| 3,545,129 | 12/1970 | Schreiber | 47—57.6 |

FOREIGN PATENTS 1,071,804  6/1967  Great Britain.

ROBERT E. BAGWILL, Primary Examiner

U.S. Cl. X.R.

111—Dig. 1; 47—57.6, Dig. 1